United States Patent [19]

Truong

[11] Patent Number: 6,151,609
[45] Date of Patent: *Nov. 21, 2000

[54] REMOTE EDITOR SYSTEM

[75] Inventor: Timothy M. Truong, Plano, Tex.

[73] Assignee: Electronic Data Systems Corporation, Plano, Tex.

[ * ] Notice: This patent issued on a continued prosecution application filed under 37 CFR 1.53(d), and is subject to the twenty year patent term provisions of 35 U.S.C. 154(a)(2).

[21] Appl. No.: 08/699,076

[22] Filed: Aug. 16, 1996

[51] Int. Cl.⁷ .................................................. G06F 17/12

[52] U.S. Cl. .......................... 707/505; 707/513; 709/219

[58] Field of Search ........................... 707/501, 505–508, 707/513, 530, 531; 709/201, 217, 218, 219; 345/335

[56] References Cited

U.S. PATENT DOCUMENTS

| | | | |
|---|---|---|---|
| 5,732,219 | 3/1998 | Blumer et al. ...................... | 395/200.57 |
| 5,793,966 | 8/1998 | Amstein et al. .................... | 395/200.33 |
| 5,867,667 | 2/1999 | Butman et al. ......................... | 709/249 |
| 5,878,219 | 3/1999 | Vance, Jr. et al. ...................... | 709/217 |
| 5,898,835 | 4/1999 | Truong .................................... | 709/217 |

OTHER PUBLICATIONS

Microsoft, Windows 3.1 User's Guide, p. 64–65, 1992.
Laura Lemay, Teach Yourself Web Publishing with HTML in a Week, Sams Publishing, pp. 296–324, 1995.

*Primary Examiner*—Joseph H. Feild
*Attorney, Agent, or Firm*—L. Joy Griebenow; Baker & Botts L.L.P.

[57] ABSTRACT

A remote editor system (26) is provided for remotely editing files stored on a remote Internet server (15). The remote editor system (26) includes a client (12), using a web browser (32), and the remote Internet server (15) having a mass storage device (44), for storing computer files, and a processor (42). The processor (42) is responsive to one or more of the computer files of the mass storage device (44). The processor (42) is responsive to communicate an editor input form to the client (12) and to receive an input text string from the client (12) that includes a server path input that identifies a path of the remote Internet server (15). The processor (42) is further responsive to store the server path input as a variable and to communicate a file selection form to the client (12) so that a user may a select a file to edit. The processor (42) receives a file selection input identifying the user's selection and provides the text of the selected file to the web browser (32) of the client (12) for editing. Once edited, the remote Internet server (15) receives the edited text and saves the file.

17 Claims, 7 Drawing Sheets

REMOTE EDITOR SYSTEM

NOTICE

"Copyright 1996 Electronic Data Systems Corporation." A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

TECHNICAL FIELD OF THE INVENTION

This invention relates generally to the field of computers and more particularly to a remote editor system.

BACKGROUND OF THE INVENTION

Internet growth and use continues to rapidly accelerate as the Internet grows in importance throughout the world. The Internet allows businesses, groups, and individuals to communicate and conduct business electronically. Communication takes place over the Internet in a variety of different ways. For example, businesses and individuals are establishing web pages and home pages that contain a variety of information and are accessible to other Internet users ("users") throughout the world. Users may also communicate with one another through the exchange of files, such as electronic mail ("e-mail") files, and through participation in discussion groups on any number of available topics.

The Internet, which is also referred to as the World Wide Web, is an interconnection of computer servers ("servers") located throughout the world. Internet servers may exchange information or web pages with one another using a protocol known as hypertext transport protocol ("HTTP"). Web pages are stored on the Internet servers and may be communicated to any other server using HTTP. Users may access the Internet from virtually anywhere in the world by interconnecting with one of the Internet servers using a client, such as a personal computer. A user accesses a web page by entering a uniform resource locator ("URL") which identifies a particular web page stored on an Internet server. The term "web page" is used herein to mean any computer file capable of being provided through a computer network to a client, processed, and then displayed. The web page is then communicated from the Internet server, where it is stored, to the server where the client is connected. The web page is then communicated to the client. In this manner, information can be easily disseminated throughout the world. Each web page on the World Wide Web has its own unique URL.

Generally, a user accesses the Internet by executing a "web browser" or "parser" program locally at the client and interconnecting to the server of an Internet service provider. The interconnection may use any of a variety of communication links such as a local telephone communication link or a dedicated communication link. The web browser is a computer program that allows the client to exchange information with the Internet. Any of a variety of web browsers are available, such as NETSCAPE NAVIGATOR, MICROSOFT EXPLORER, NCSA MOSAIC, and others that allow users to conveniently access and navigate the Internet using a graphical user interface. Web browsers receive web pages in a format or language understandable by a web browser, such as Hypertext Markup Language ("HTML"). Web browsers interpret the web pages and generate a corresponding display of the web pages using a graphical user interface.

Some web pages include on-screen forms, including fill-in text boxes, option buttons, radio buttons, and drop-down list boxes that allow a user to interact with a web page. The information provided in these forms may be used as input to a program executing at the server where the web page is stored so that an output web page may be generated in response. NETSCAPE NAVIGATOR, MICROSOFT EXPLORER, and NCSA MOSAIC are known as "forms-capable browsers" because they can interpret HTML code which provides these forms.

Still other web browsers are script-enabled browsers, such as JAVASCRIPT-enabled browsers, and are capable of interpreting HTML web pages that include embedded script within the HTML code. The embedded-script code is interpreted by a script-enabled browser at the client for enhanced processing capability.

Web page designers are able to use the HTML language and scripting languages such as JAVASCRIPT to create web pages or home pages that may be displayed at a client running a web browser. Each web page is assigned a unique address or URL so that users of the Internet may access a desired web page by entering its URL. Many web pages also provide various graphical icons that, if selected, will automatically access another web page. While other web pages include graphical icons that, if selected, will execute a program at a server that generates an output as a web page in HTML format. This output can then be displayed like any other web page. In this manner, users may conveniently navigate the Internet by simply using their mouse and "clicking" on a graphical icon or a link that will automatically take them to a desired web page.

The popularity of the Internet and computers in general has increased the demand for personnel trained in the computer sciences to serve as system administrators. System administrators are responsible for the operation of multiuser computer systems, such as Internet servers. A system administrator of an Internet server is sometimes referred to as a Webmaster. The term system administrator is used hereinafter to include any user having access or authority to edit a file on a computer or server.

System administrators perform such duties as assigning user accounts and passwords, establishing security access levels, and allocating storage space, as well as being responsible for other tasks such as watching for unauthorized access and preventing virus programs from entering the system. This often involves accessing, viewing, and editing various files of the system. System administrators are also in charge of correcting and recovering from any system failures, such as mass storage failures and memory failures, and returning the system back to normal operation.

Problems arise when system administrators of Internet servers are not physically located at the site of the server and various files of the server need to be accessed, edited, and saved. System administrators have attempted to solve this problem by using communication programs, such as PROCOMM PLUS by DATASTORM TECHNOLOGIES, INC., and a personal computer with a modem so that the system administrator may directly connect by telephone line to the Internet server and access any file as needed.

This solution has proven troublesome for several reasons. First, the specialized communication software may not be available to the system administrator at all times, such as when the system administrator is on vacation or when the system administrator's personal computer fails. Second, it is often still necessary to set up and initialize communication software at the server and ensure that the communication software and modem is operational to receive incoming calls. This still requires the physical presence of personnel at the server at a time when personnel may be unavailable. Additionally, remote access using a communication program often involves using a telephone system where expensive long distance telephone fees are incurred. These problems may prevent a system administrator, located away from the server, from accessing and editing files as needed to ensure that the server remains available.

SUMMARY OF THE INVENTION

From the foregoing it may be appreciated that a need has arisen for a remote editor system that allows files stored on an Internet server to be remotely edited. In accordance with the present invention, a remote editor system is provided that allows files stored on an Internet server to be selected and edited or viewed using any client of the Internet using a forms-capable web browser. This eliminates the need to use dedicated communication software to directly access a remote server through a telephone communication link and a dedicated modem. The term "remote location," as used herein, may include any physical distance from a few feet to many thousands of miles and may be a distance across the world, across town, or even across a room.

According to an embodiment of the present invention, there is provided a remote server system using a server coupled to a network that includes a storage medium for storing computer files and a processor responsive to one or more of the computer files of the storage medium. The processor is responsive to communicate an editor input form to a client of the network using a parser program after receiving a request from the client. The processor is then responsive to receive an input text string from the client, that includes a server path input identifying a server path, and stores the server path input as a variable. The processor then generates and communicates an editor selection form to the parser of the client. The editor selection form includes the text of the filenames identifying files included in the server path. After receiving a file selection input identifying one of the files, the processor is responsive to communicate the text of the file to the parser of the client for editing and later saving or storing at the server.

A technical advantage of the present invention includes the ability to remotely access, view, edit, and save a server file using any client having a web browser and connected to the Internet. As the popularity of the Internet increases, Internet connections through a client using a web browser are becoming common place and are frequently found in such places as hotels, libraries, airports, kiosks, and retail stores. This allows a server system administrator to access and edit server files from virtually anywhere in the world without having to have specialized or dedicated communication software available. Another technical advantage of the present invention includes the elimination of costly long distance telephone fees incurred when accessing a server remotely through a long distance telephone connection. Other technical advantages are readily apparent to one skilled in the art from the following figures, description, and claims.

BRIEF DESCRIPTION OF THE DRAWINGS

For a more complete understanding of the present invention and the advantages thereof, reference is now made to the following brief description, taken in connection with the accompanying drawings and detailed description, wherein like reference numerals represent like parts, in which.

DETAILED DESCRIPTION OF THE INVENTION

Figure 1:
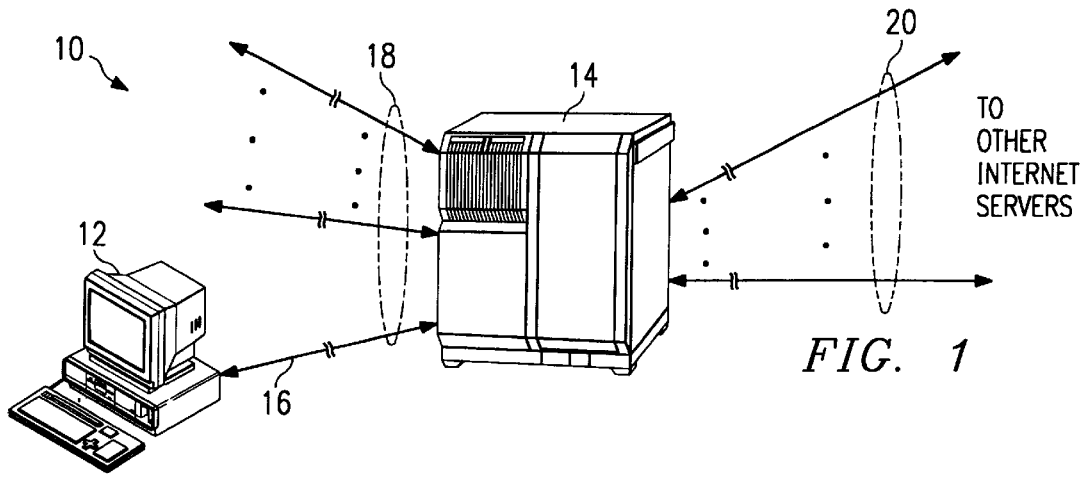
FIG. 1 is a diagram illustrating a network interconnection including a client and an Internet server.

Turning first to the nomenclature of the specification, the detailed description which follows is represented largely in terms of processes and symbolic representations of operations by conventional computer components, including a central processing unit ("CPU") or processor associated with a general purpose computer system, memory storage devices for the CPU, and connected pixel-oriented display devices. These operations include the manipulation of data bits by the CPU and the maintenance of these bits within data structures resident in one or more of the memory storage devices. Such data structures impose a physical organization upon the collection of data bits stored within computer memory and represent specific electrical or magnetic elements. These symbolic representations are the means used by those skilled in the art of computer programming and computer construction to most effectively convey teachings and discoveries to others skilled in the art.

For the purposes of this discussion, a process or method is generally considered to be a sequence of computer-executed steps leading to a desired result. These steps generally require manipulations of physical quantities. Usually, although not necessarily, these quantities take the form of electrical, magnetic, or optical signals capable of being stored, transferred, combined, compared or otherwise manipulated. It is conventional for those skilled in the art to refer to these signals as bits, values, elements, symbols, characters, text, terms, numbers, records, files, or the like. It should be kept in mind, however, that these and some other terms should be associated with appropriate physical quantities for computer operations, and that these terms are merely conventional labels applied to physical quantities that exist within and during operation of the computer.

It should also be understood that manipulations within the computer are often referred to in terms such as adding, comparing, moving, etc., which are often associated with manual operations performed by a human operator. It must be understood that no involvement of a human operator is necessary or even desirable in the present invention. The operations described herein are machine operations performed in conjunction with a human operator or user that interacts with the computer or computers.

In addition, it should be understood that the programs, processes, methods, etc. described herein are but an example of one implementation of the present invention and are not related or limited to any particular computer, apparatus or computer language. Rather, various types of general purpose computing machines or devices may be used with programs constructed in accordance with the teachings described herein. Similarly, it may prove advantageous to construct a specialized apparatus to perform the method steps described herein by way of dedicated computer systems with hard-wired logic or programs stored in non-volatile memory, such as read-only memory.

Referring now in more detail to the drawings, FIG. 1 is a diagram illustrating a network interconnection 10 including a client 12 and an Internet server 14. Network interconnection 10 includes the interface between Internet server 14 and a plurality of clients through a plurality of direct communication lines 18. For example, network interconnection 10 includes an interconnection between client 12 and Internet server 14 through a direct communication line 16. Network interconnection 10 also includes the interface between Internet server 14 and other Internet servers through a plurality of communication lines 20. In this manner, Internet server 14 allows the plurality of clients directly interconnected with server 14, such as client 12, to communicate with other Internet users by providing an interconnection to other Internet servers through communication lines 20. The other Internet users are also directly interconnected with a server such that a communication path may be established between one client and another client through the various servers of the Internet. Internet server 14 may be used by a local Internet service provider to allow users to access the Internet.

Internet server 14 is a computer such as a personal computer, file server, workstation, minicomputer, mainframe, or any other computer capable of communicating and interconnecting with other computers. Internet server 14 will preferably include a processor, a printer, an input device such as a mouse and/or a keyboard, a monitor, a floppy disk drive, memory, a modem, and a mass storage device such as a hard disk drive. Communication lines 20 and direct communication lines 18 may be any type of communication link capable of supporting data transfer. For example, these communication lines may include any combination of an Integrated Services Digital Network ("ISDN") communication line, a hard wired line, or a telephone link.

Client 12 may be similar to Internet server 14 and may be implemented using virtually any type of computer. Client 12 will preferably be a personal computer having a processor, a printer, an input device such as a mouse and/or a keyboard, a monitor, a floppy disk drive, memory, a modem, and a mass storage device such as a hard disk drive. Client 12 and Internet server 14 will be operating under the control of an operating system such as MS-DOS, Macintosh OS, WINDOWS NT, WINDOWS 95, OS/2, UNIX, XENIX, and the like. Client 12 and Internet server 14 may execute any number of available application programs such as a web browser.

In operation, the various clients of network interconnection 10, such as client 12, may communicate through server 14 with any other client connected to the Internet. For example, client 12, generally using a web browser application program, may couple to Internet server 14 and provide the address or URL of an Internet web page. The Internet web page will generally be stored on another Internet server located anywhere in the world. Internet server 14, through the plurality of communication lines 20, communicates with other Internet servers using HTTP and provides the URL to other Internet servers. Eventually, the receiving Internet server is found and in response, transmits the Internet web page back to Internet server 14 for viewing by client 12 using a web browser.

Although network interconnection 10 has been illustrated and described in FIG. 1 as being a node or interconnection on the Internet, network interconnection 10 may be any interconnection found on any computer network such as a local area network ("LAN"), a wide area network ("WAN"), an intranet, such as a corporate intranet, or any other communications and data exchange system created by connecting two or more computers. The present invention will be illustrated and described with an implementation using the Internet, however, it should be understood that the present invention is not limited to only implementations using the Internet.

Figure 2:
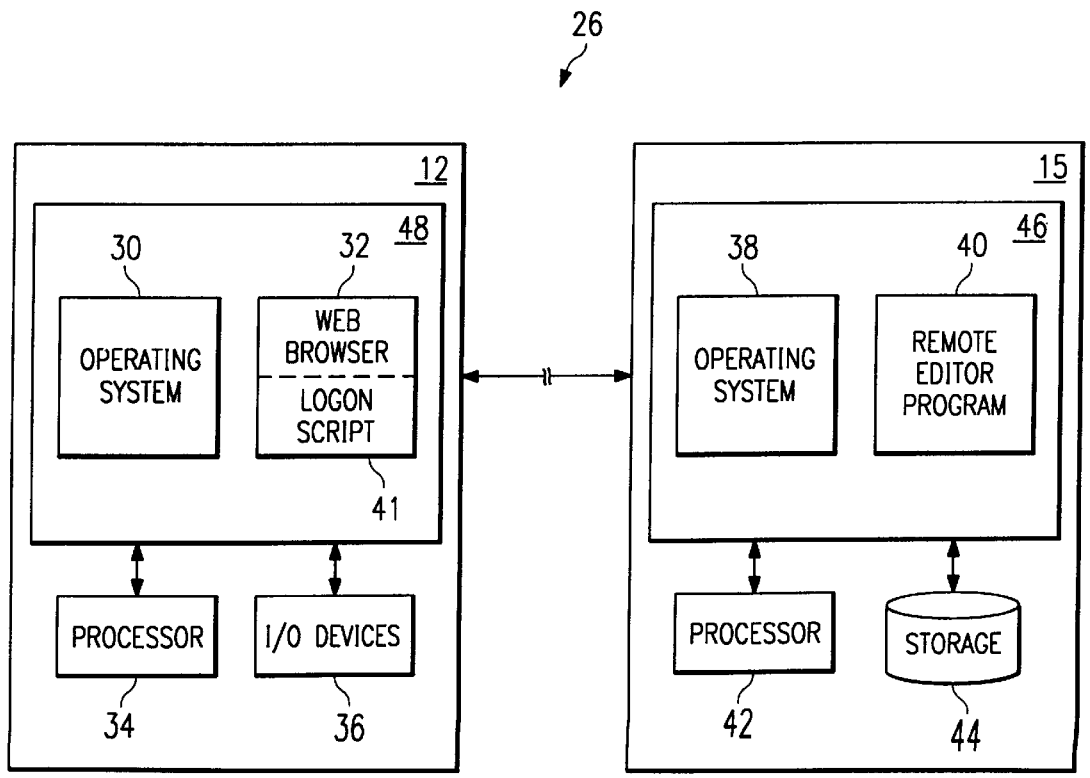
FIG. 2 is a block diagram illustrating the client and a remote Internet server configured as a remote editor system.

FIG. 2 is a block diagram illustrating client 12 and a remote Internet server 15 configured as a remote editor system 26. Client 12 includes a processor 34, input/output ("I/O") devices 36, and a client memory 48. Processor 34, under the control of an operating system 30, controls the operation of client 12 and is used to retrieve, process, store, and display data. Operating system 30 and a web browser 32 are stored in client memory 48. A logon script 41 may also be stored in client memory 48 and is provided as an embedded script from an Internet web page. Logon script 41 is discussed more fully below. Client memory 48 may be a random access memory ("RAM").

Processor 34 is typically implemented as a microprocessor, such as those manufactured by INTEL or MOTOROLA. Processor 34 may include an arithmetic logic unit to assist in performing mathematical operations. Processor 34 communicates control, address, and data signals with operating system 30 and with the remaining components of client 12 through a system bus. Processor 34 interprets and executes instructions that have been fetched or retrieved from client memory 48 and may be implemented as a single integrated circuit or as a combination of integrated circuits.

I/O devices 36 may include any peripheral that allows data to be exchanged with client 12 and may include such devices as a keyboard, a monitor, a printer, a modem, a pointing device, such as a mouse, a floppy disk drive, a mass storage device, such as a hard disk drive, and the like. The mass storage device is used to store computer files including application programs and data files. For example, the mass storage device may be used to store web browser 32 and operating system 30.

Operating system 30 includes a set of computer programs that control the internal functions of client 12, thereby allowing client 12 to run application programs. Operating system 30 is typically stored in and provided from a mass storage device, such as a hard disk drive, a floppy disk drive, a CD ROM drive or a ROM chip. During start-up or initialization of client 12, operating system 30 is loaded into client memory 48. Application programs, such as web browser 32, may also be loaded into client memory 48 along with operating system 30.

Web browser 32 is preferably a graphical web browser or parser that allows a user to view images, fonts, and document layouts provided in a web page by converting large units of data into smaller, more easily interpreted, units of data. Web browser 32 reads the tagged text of a web page provided in HTML format. HTML uses tags to identify the parts of a web page, such as headings, bulleted lists, body text, on-screen forms, including fill-in text boxes, option buttons, radio buttons, and drop-down list boxes, images to be displayed, hypertext links, colors, font, and various other formatting tags. Web browser 32 formats the various parts of the document for on-screen display as directed by the HTML tags.

Web browser 32 is also a script-enabled browser which enables it to interpret HTML formatted web pages that include embedded script within the HTML code. The embedded script is provided to web browser 32 at client 12 for enhanced processing at client 12. The embedded script may be provided in JAVASCRIPT format or any other scripting language format that is provided to a web browser at a client for enhanced processing.

Web browser 32 operates in conjunction with operating system 30 so that client 12 may properly interface with the Internet. Web browser 32 provides a graphical user interface and is accessed by operating system 30 at the request of a user. Once client 12 is coupled to Internet server 14 through direct communication line 16, as shown in FIG. 1, web pages may be accessed by entering the URL of the desired web page into web browser 32. It should be noted that web browser 32 is not a terminal emulation program or communication program that is used at client 12 to emulate a server terminal operating directly from remote Internet server 15.

Once a desired web page is retrieved, web browser 32 may receive formatting information and embedded script from a file defining the web page. The file defining the web page is generally located at a remote Internet server, such as remote Internet server 15 as shown in FIG. 2. Typically, web browser 32 receives the information in HTML format and the embedded script in JAVASCRIPT format so that the web page may be interpreted and processed using processor 34 and web browser 32 of client 12 and then graphically displayed at client 12. Often, a web page will contain user selectable icons that are preprogrammed with the URL of a related web page so that a user may conveniently navigate the Internet by selecting these icons.

Remote Internet server 15 includes a server memory 46, a processor 42, and a mass storage device 44. Although not shown in FIG. 2, remote Internet server 15 also preferably includes various I/O devices such as those mentioned above in the description of I/O devices 36 of client 12. Operating system 38 and remote editor program 40 are stored in mass storage device 44 and are shown loaded into server memory 46.

Processor 42, in conjunction with operating system 38, controls the operation of remote Internet server 15. Processor 42 fetches and executes various instructions stored in server memory 46. Operating system 38 operates similarly to operating system 30 of client 12 and includes a set of computer programs that control the internal functions of remote Internet server 15. Operating system 38 controls the allocation and usage of hardware resources such as server memory 46, processor 42, mass storage device 44, and optional I/O devices (not specifically shown). Operating system 38 may be any of a variety of available operating systems depending partially on the hardware of server 14. For example, operating system 38 may be implemented as MS-DOS, the Macintosh OS, OS/2, WINDOWS NT, WINDOWS 95, UNIX, XENIX or any of a variety of other operating systems.

Remote editor program 40 is an application program shown loaded into server memory 46. Remote editor program 40 is stored in mass storage device 44 and is then loaded into server memory 46 when selected by a user. This may occur when a user of client 12, while accessing the Internet using web browser 32, requests a particular web page that will automatically load remote editor program 40 into server memory 46. In response, HTML code and any embedded script may be provided to web browser 32. For example, logon script 41, as shown in client memory 48 with web browser 32, may be provided to client 12 where it is processed using web browser 32 and processor 34.

Remote editor program 40, discussed more fully below in connection with FIGS. 3A through 3C, 4, 5, and 6, communicates an editor input form, including HTML code and embedded script code, to web browser 32 of client 12. In response, client 12 preferably prompts the user for an input including a logon ID, a password, and a remote server path using a web page, such as that shown in FIGS. 3A through 3C. Remote editor program 40 may be implemented using a common gateway interface ("CGI") program, called a script, that receives the input from web browser 32 of client 12, processes the input and executes other programs of remote Internet server 15 as necessary, and provides any results to web browser 32 in HTML format. Appendix A includes some sample code of one such implementation of the editor input form of remote editor program 40.

The logon ID, password, and remote server path inputs identify a particular user and whether the user has access rights to remote Internet server 15. Logon script 41, provided by remote editor program 40 through the editor input form, is stored in client memory 48 and is interpreted by web browser 32 to determine whether text has been entered into the logon ID input and the password input. Assuming that text has been entered, the inputs are communicated back to remote editor program 40 of remote Internet server 15 as an input text string. Remote editor program 40 receives the input text string from the client and parses the input text string to identify a server path input. This server path input identifies a particular path at remote Internet server 15. Assuming that the user provided a valid logon ID and password, as provided through the input text string, remote editor program 40 stores the server path input as a variable and generates a file selection form. The file selection form includes the text of the file names identifying files included in the server path defined by the server path input. Remote Internet server 15, under the control of remote editor program 40, communicates the file selection form to the client in HTML format.

Figure 4:
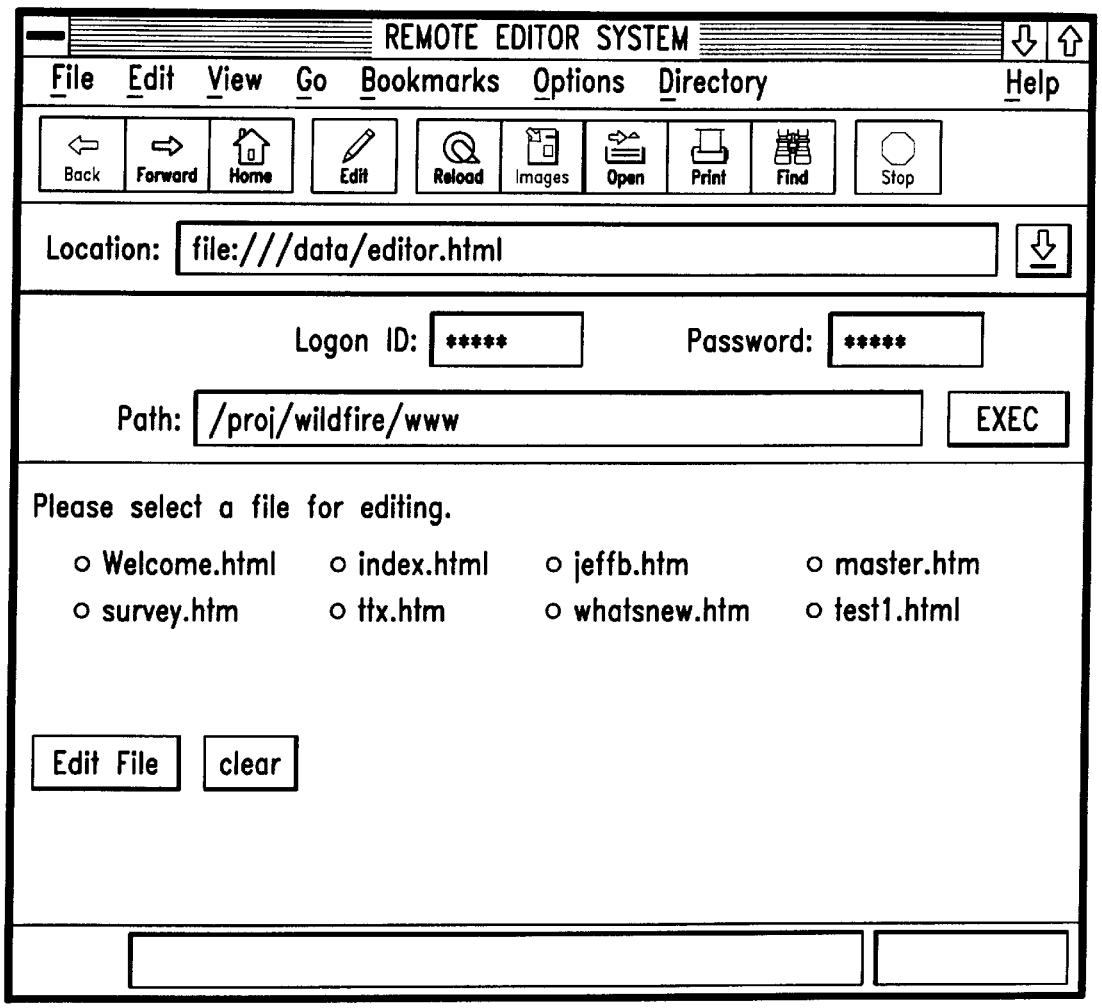
FIG. 4 is an exemplary output display of the remote editor system provided to the web browser illustrating the display of a file selection form.

Web browser 32 of client 12 receives the file selection form and provides a display such as that shown in FIG. 4. The user then selects the desired file for editing by selecting the radio button corresponding to the desired file. Once selected, the user selects the execute button and web browser 32 of client 12 provides a file selection input to remote Internet server 15. The file selection input identifies the file name of the file selected by the user. In response, remote Internet server 15, under the control of remote editor program 40, communicates the text of the file to web browser 32 of client 12 for editing. The file may then be edited and sent back to remote Internet server 15 where the edited text is stored under the selected file name. In this manner, a system administrator located away from Internet server 15 may access, view, and edit any file stored at Internet server 15.

The present invention may be implemented using any of a variety of computer languages and using any of a variety of computer hardware operating under any of a variety of operating systems. For example, remote Internet server 15 may be a work-station operating under the UNIX operating system. The UNIX operating system supports shell scripts, such as Korn shells, that may be used to provide various programming features and to provide HTML information to a web browser. Korn shells function as CGI scripts and may also be used to call other routines such as C programs. The Korn shell serves as a CGI program and provides HTML formatted information to web browser 32 so that the output of remote editor program 40 may be displayed as a web page.

Figure 3A:
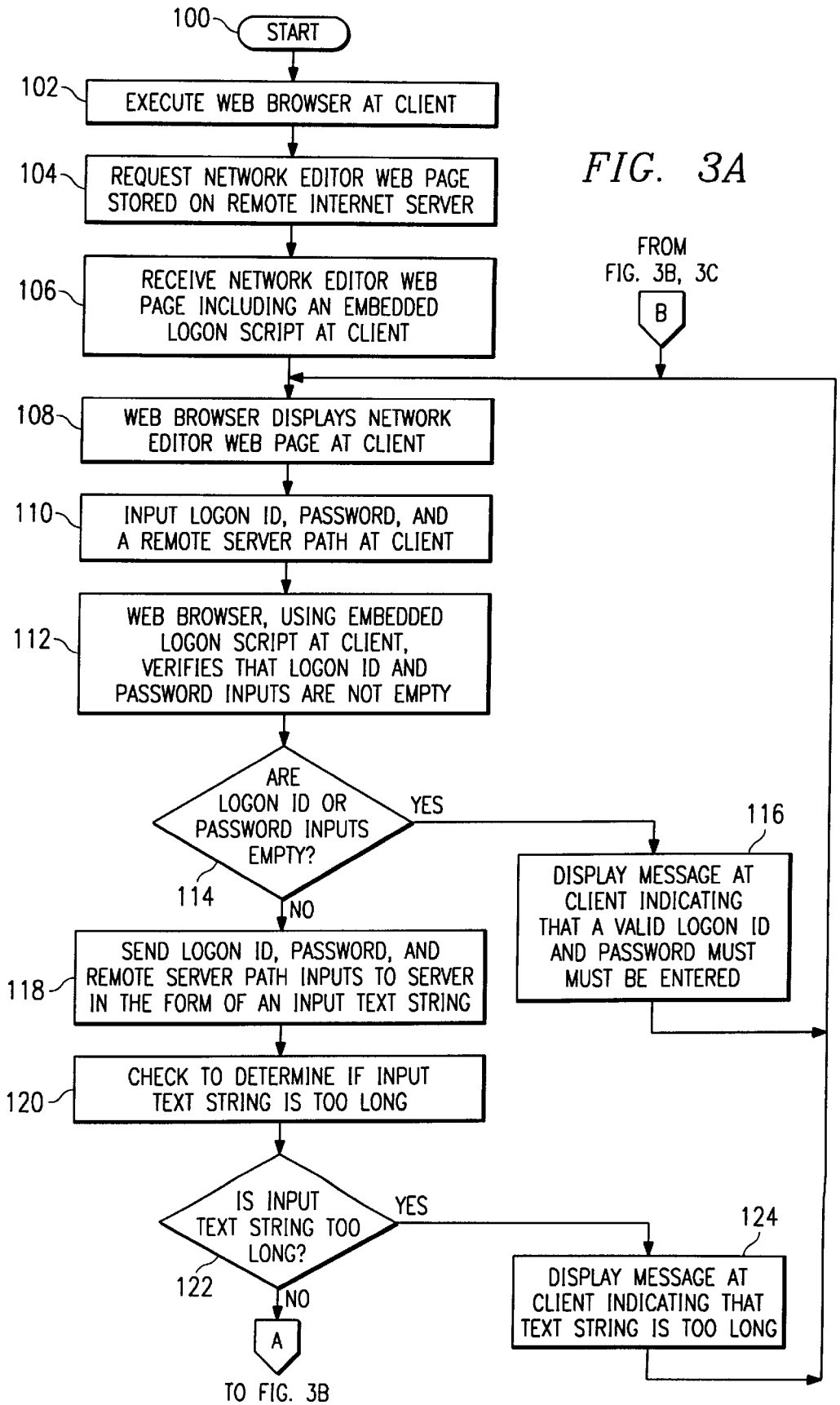
FIGS. 3A through 3C depict a flowchart illustrating an exemplary method of using the remote editor system.
Figure 3B:
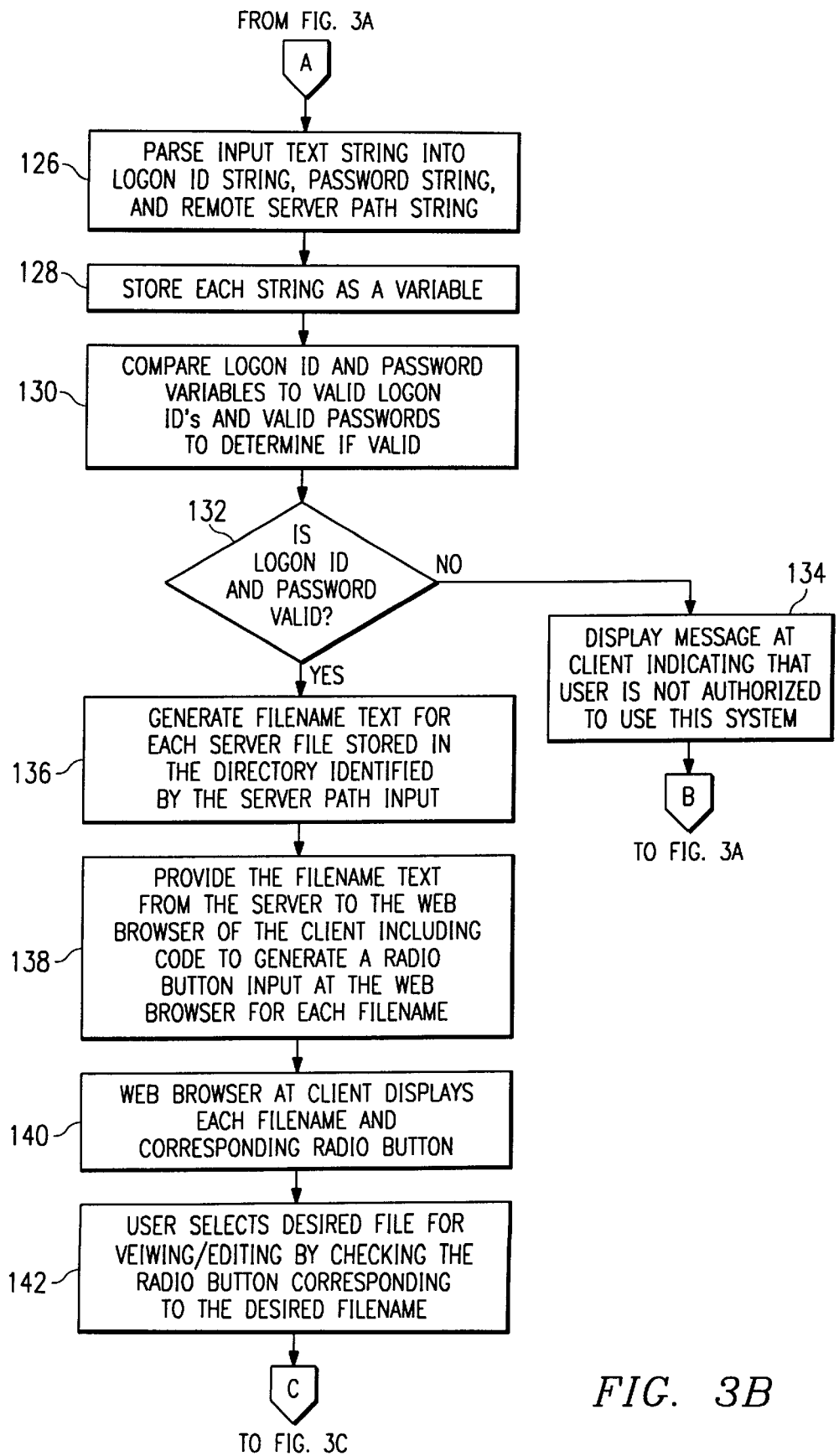
Figure 3C:
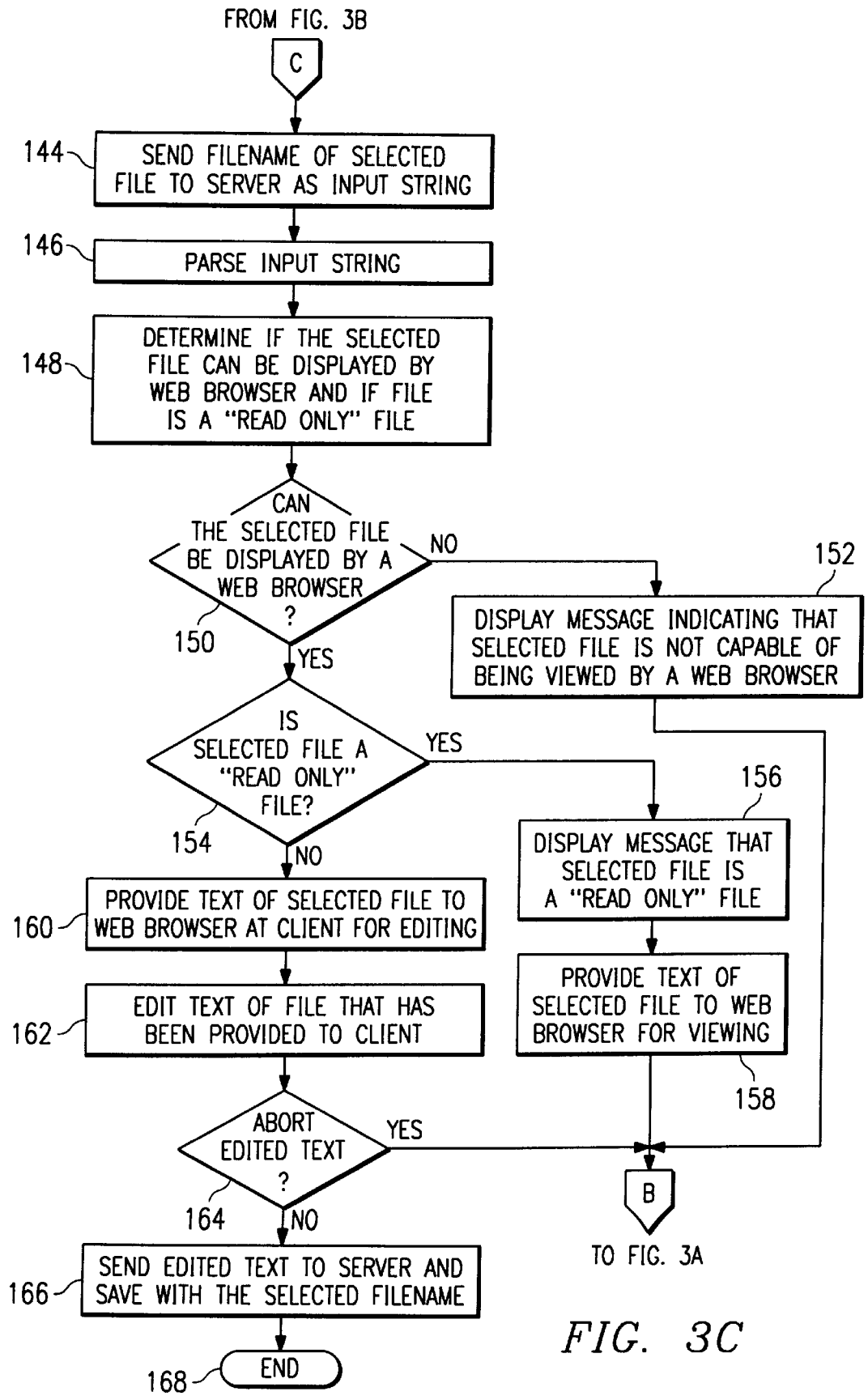

FIGS. 3A through 3C depict a flow chart illustrating an exemplary method of using remote editor system 26. The method begins at step 100 and proceeds to step 102 where a web browser application program is executed at a client and the client in turn connects to the server of an Internet service provider. At step 104 a user enters the URL of a network editor web page stored on a remote Internet server. Next, at step 106 the remote Internet server provides the network editor web page to the web browser at the client. The network editor web page may also be referred to as an editor input form and preferably includes a first part, generally provided in HTML format to the web browser or the client, and is used to generate an input screen at the client. The network editor web page preferably also includes a second part, generally provided in JAVASCRIPT format, that is provided to the web browser of the client so that the client may perform local processing such as logon script 41 of FIG. 2. The network editor web page includes HTML code and JAVASCRIPT code.

The method proceeds next to step 108 where the web browser displays the network editor web page at the client. The network editor web page provides input fields for a logon ID input, a password input, and a remote server path input such as that shown in FIGS. 4, 5, and 6. Then at step 110 a user provides a logon ID, a password, and a remote server path as an input at the web browser of the client.

At step 112 the web browser, using the embedded logon script provided in step 106, performs processing to ensure that the logon ID and password fields are not empty. The logon script simply checks to ensure that something has been entered in both of these inputs. At decision step 114 it determines whether the logon ID input or the password input are empty. If so, at step 116, a message is displayed at the web browser of the client indicating that a valid logon ID and password must be entered to access the system. The method then returns to step 108 where the user has the opportunity to enter a valid logon ID and password. Otherwise, the method at decision step 114 proceeds to step 118.

Step 118 involves sending the logon ID, password, and remote server path inputs to the remote Internet server in the form of an input text string. The server receives the input text string at step 120 and determines whether too many characters have been provided by the user at decision step 122. If too many characters have been provided in the input text string, the method proceeds to step 124. Step 124 involves displaying a message at the client indicating to the user that the text string is too long and that shorter inputs, in particular the remote server path, must be provided. The method then proceeds back to step 108. Otherwise, the method at decision step 122 proceeds to step 126.

Step 126 involves parsing the input text string into a logon ID string, a password string, and a remote server path string. The method then proceeds to step 128 where each string is stored as a variable. Next, the method proceeds to step 130 where the logon ID and password variables are compared to valid logon IDs and valid passwords to determine if both of these inputs are valid. This may be done by comparing the logon ID variable and the password variable to entries in a file or to other variables storing valid logon IDs and passwords. The method proceeds next to decision step 132. Decision step 132 proceeds to step 134 if the logon ID and the password are determined not to be valid. Step 134 displays a message at the client indicating that the user is not authorized to use this system. The method then returns to step 108 where the user may enter a valid logon ID and password. After a predetermined number of attempts, the method may proceed to step 168 where the method ends. On the other hand, if the logon ID and password are determined to be valid in decision step 132, the method proceeds to step 136.

Step 136 and step 138 involve generating file name text for each server file stored in the directory identified by the server path input variable and providing this text to the web browser of the client along with code to generate a radio button input next to the text of each file name at the web browser. The text as provided to web browser in these steps may be referred to as a file selection form. At step 140 the web browser of the client displays the text of each filename and the corresponding radio button as illustrated in the exemplary output display of FIG. 4.

The method proceeds next to step 142 where a user selects the desired file for viewing/editing by selecting the radio button corresponding to the desired filename. At this point the method proceeds to step 144 where the filename of the selected file is sent to the server. The filename may be sent as a text string and referred to as a file selection input which identifies the selected file. The server parses the input string of the file selection input in step 146. Next, at step 148 a search is performed on the selected file at the server to see whether the file contains certain code or text, such as HTML tags, that would interfere with the web browser at the client when interpreting this file. Step 148 also involves looking at the attributes of the selected file to determine if the file is a read-only file. The method proceeds next to decision step 150 where if the file cannot be displayed by web browser, the method proceeds to step 152 where a message is displayed at the client indicating that the selected file is not capable of being viewed by the web browser. The method then would return to step 108. If decision step 150 determines that the file may be displayed by web browser, the method proceeds to decision step 154.

Figure 6:
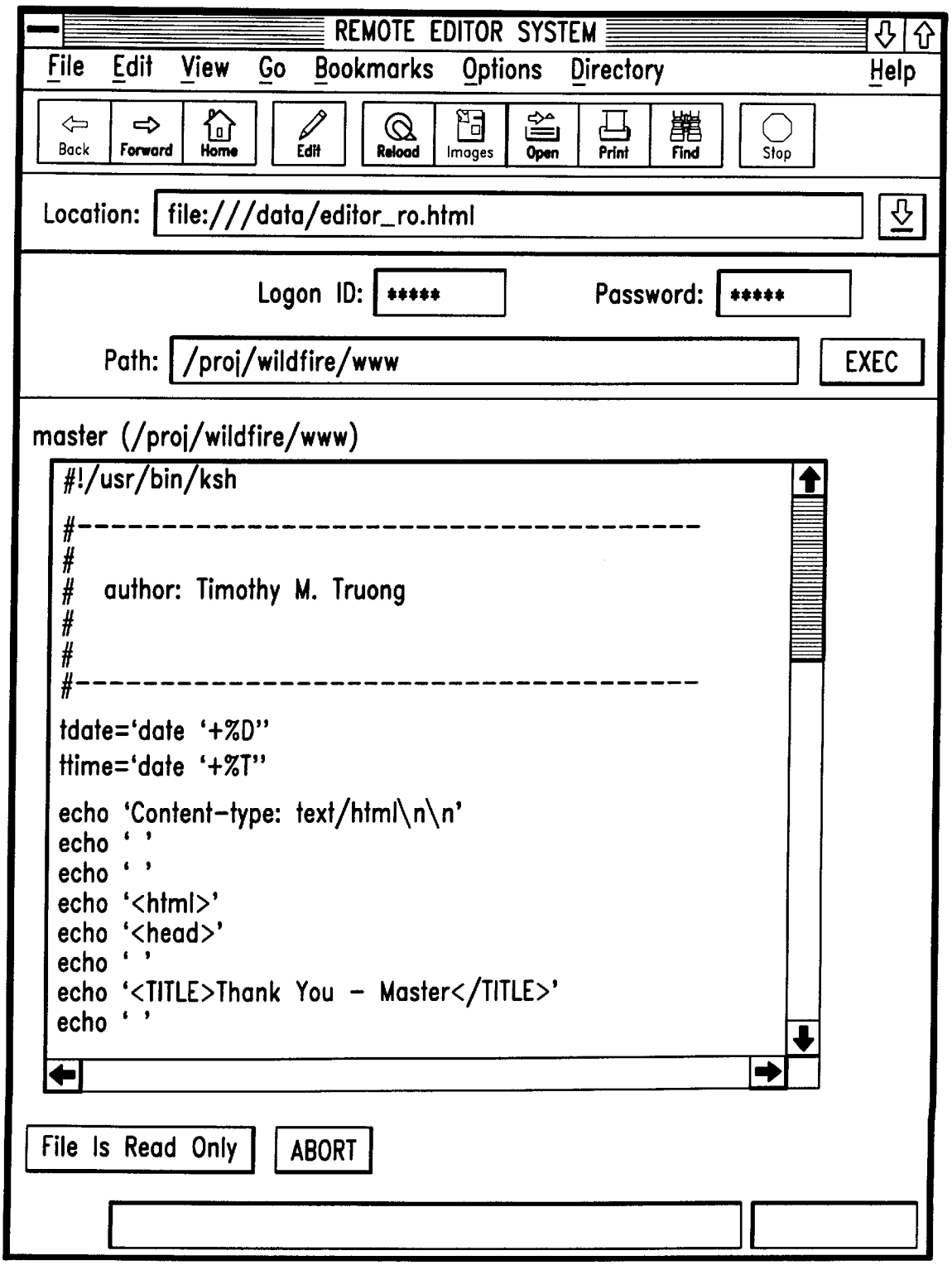
FIG. 6 is an exemplary output display of the remote editor system provided to the web browser illustrating the display of a read-only file.

The method proceeds next to step 156 if decision step 154 determines that the file is a read-only file. Step 156 involves displaying a message to the web browser at the client indicating that the selected file is a read-only file. Then at step 158, the text of the read-only file is provided to the web browser for viewing as illustrated in FIG. 6. The method then proceeds to step 108. However, if decision step 154 determines that the selected file is not a read-only file, the method proceeds instead to step 160.

Figure 5:
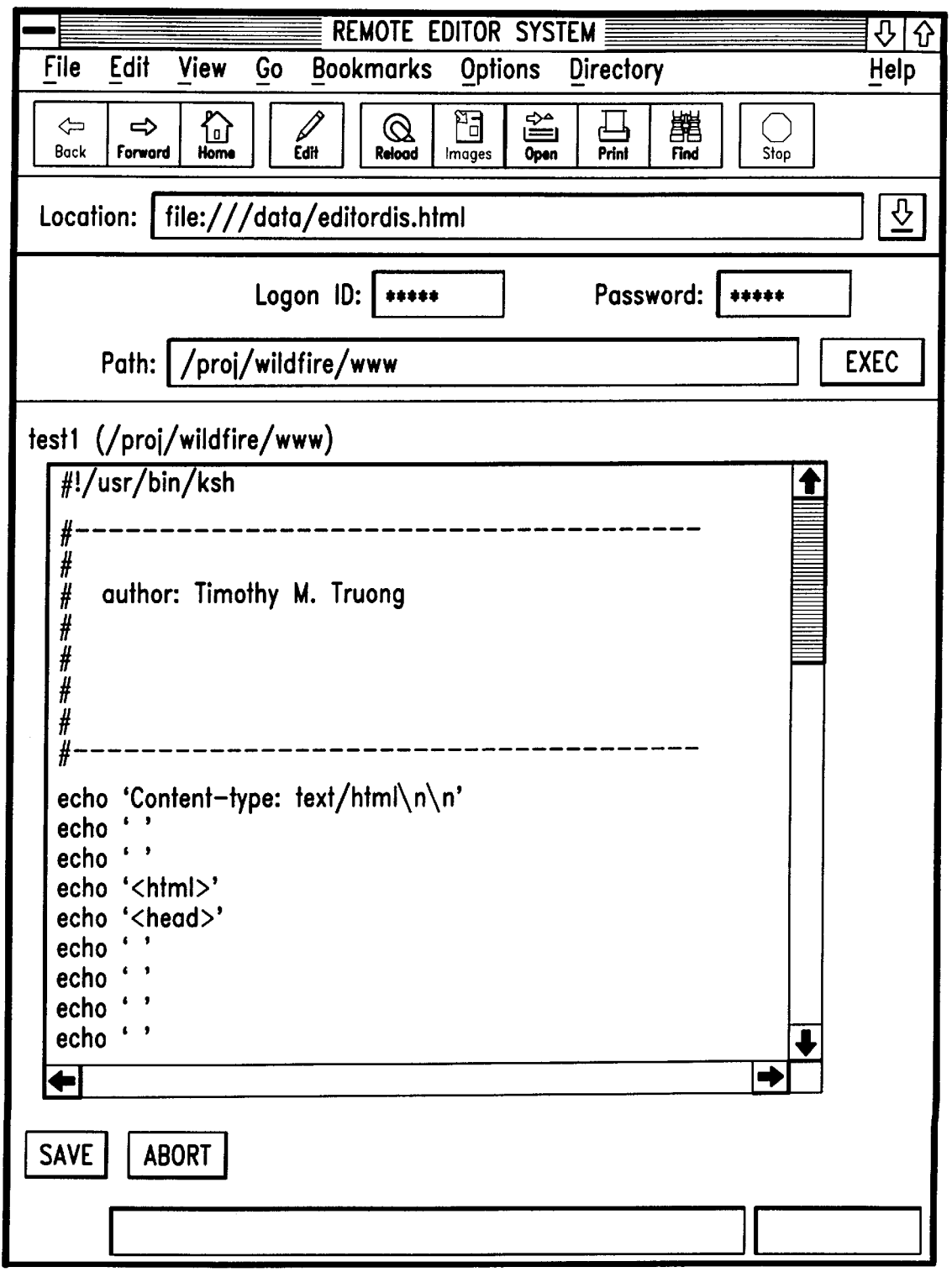
FIG. 5 is an exemplary output display of the remote editor system provided to the web browser illustrating the display of a file for editing.

Step 160 involves providing the text of the selected file to the web browser for editing as shown in FIG. 5. The method then proceeds to step 162 where the text may be edited at the web browser using editing features such as delete, select, search, copy, paste, and the like. The text may be scrolled up/down and right/left using the provided arrows. After the text has been edited in step 162, the method proceeds to decision step 164. Decision step 164 determines whether or not the abort button has been selected, as shown in FIG. 5. If the abort button is selected, the method returns to step 108; otherwise, the method proceeds to step 166 where the edited text is sent from the client to the server and saved under the selected filename. The method ends at step 168.

FIG. 4 is an exemplary output display of remote editor system 26 provided to web browser 32 illustrating the display of a file selection form. At the point when the file section form is displayed, the user has already entered the URL of the remote editor web page in the Location field and has provided a valid logon ID, password, and remote server path. After entering the logon ID, password, and path, the user has selected the "EXEC" button and remote editor system 26 as responded with the file selection form listing the eight files and corresponding radio buttons as shown in FIG. 4. At this point, the user may select a file for editing or viewing by selecting the radio button corresponding to the desired file. After selecting the radio button, the edit file button is selected and remote editor system 26 responds with the display as shown in FIG. 5 or FIG. 6 depending on whether the selected file is displayable by web browser 32 and whether the file is a read-only file.

FIG. 5 is an exemplary output display of remote editor system 26 provided to web browser 32 illustrating the display of a selected file for editing. In this case, remote editor system 26 has provided the "test1" file for editing after determining that this file may be viewed by web browser 32 and the file is not a read-only file. A user may now edit the text of the file as desired. Assuming that remote editor system 32 is running under the WINDOWS operating system, any of the basic WINDOWS editing commands such a copy, insert, delete, and paste may be used when editing the file.

FIG. 6 is an exemplary output display of remote editor system 26 provided to web browser 32 illustrating the display of a read-only file. If remote editor system 26 determines that the selected file is viewable by a web browser but is a read-only file, remote editor system 26 provides the file, such as the "master" file as shown in FIG. 6, for viewing by the user. The user may use the up/down and left/right arrows to navigate the document. When finished, the user may select the abort button or may enter a different path in the path field and select the "EXEC" button to retrieve a new file selection form for a different path of remote Internet 15. Remote editor system 26 displays a message that the file is read-only file with the text shown towards the bottom of FIG. 6.

Thus, it is apparent that there has been provided, in accordance with the present invention, a remote editor system that allows a file to be edited from a remote location that satisfies the advantages set forth above. Although the preferred embodiment has been described in detail, it should be understood that various changes, substitutions, and alterations can be made herein. For example, the present invention may be implemented on any computer, computer network, or interconnection of computers. Also, the direct interconnections illustrated herein could be altered by one skilled in the art such that two computers or devices are merely coupled to one another through an intermediate computer or device without being directly connected while still achieving the desired results demonstrated by the present invention. Although the present invention has been primarily described and shown as implemented on the Internet, it should be understood that the present invention is not limited to the Internet and can include a variety of other computer networks such as an intranet. Other examples of changes, substitutions, and alterations are readily ascertainable by one skilled in the art and could be made without departing from the spirit and scope of the present invention.

APPENDIX A

```
<HTML>
<HEAD>
<TITLE>Remote Editor System</TITLE>
<BASE HREF = "http://www.sets">
<META NAME = "AUTHOR" CONTENT = "tim">
</HEAD>
<!_____>
<frameset rows = "10%, *">
```

APPENDIX A-continued

```
   <frame name = "headframe" arc =
   "file:///c:/patent/texhead.htm" scrolling="no">
   <frame name = "bodyframe" src =
   "file:///c:/patent/texbody.htm">
</frameset>
<!_____>
</HTML>
<HTML>
<HEAD>
<TITLE>Remote Editor System</title>
<BASE HREF = http://www.sets">
<META NAME = "AUTHOR" CONTENT = "tim truong">
   </HEAD>
   <BODY background = ". ./papers/chalk.xxx">
   </BODY>
   </HTML>
<HTML>
<HEAD>
<TITLE>Remote Editor System</title>
<BASE HREF = "http://www.sets">
<META NAME = "AUTHOR" CONTENT = "tim truong">
<script language = "livescript">
<!_____ to hide script contents from old browsers
function MakeArray (n)
   {
     this.length = n
     return this
   }
pathNames as new MakeArray(2)
pathNames [0] as "/proj/wildfire/www/httpd/cgi-bin/PRC-cgi-bin"
pathNames [1] = "proj/wildfire/www_doc/sets/PRC"
function filldir (form)
   {
     for (var i = 0; <2; i++)
     {
       if (form.dirname[i].checked)
       {
         form.dirpath.value = pathNames [i];
         form.dirpath.focus0;
       }
     }
   }
function runpl (form,button)
   {
     if form.idtext.value.length = = 0 )
     {
       alert ("Need to have ID to process request.");
       form.target = "headframe";
       form.action = "file:///c:/patent/texhead.htm";
     }
   }
// end hiding contents from old browsers_____>
   </script>
   </HEAD>
   <BODY background =". ./papers/chalk.xxx">
   <form method = "post" action = "/PRC-egi-bin/tex" target =
   "bodyframe">
   <center>
   <table border = 0>
     <tr>
       <td align = center valign = middle>
       Logon ID: <input type = "text" name = "idtext"
       size = 9>
       Password: <input type = "password" name =
       "passwdtext" size = 10>
       </td>
       <td align = center>
       <input type = "radio" name = "dirname" value =
       0 onclick = "filldir(this.form)"> CGI
       <input type = "radio" name = " "dirname" value =
       1 onclick = filldir(this.form)"> PRC
       <input type = "text" name = "dirpath" size =
       40>
       </td>
       <td>
       <input type = "submit" name = "exec" value =
       "EXEC" onclick =
       "runpl(this.form,this.button)">
       </td>
```

APPENDIX A-continued

```
        </tr>
      </table>
    </form>
    <br>
    <hr>
  </BODY>
</HTML>
#- - - - - - - - - - - - - - - - - - - - - - - - - - - - - - - - - - - - - - - - -

# author: Timothy M. Truong

#- - - - - - - - - - - - - - - - - - - - - - - - - - - - - - - - - - - - - - - - -
echo 'Content-type: text/html\n\n'
echo ' '
echo ' '
echo '<html>'
echo '<head>'
echo ' '
echo "<TITLE>Remote Editor System</title>"
echo '<base href="http://www.sets">'
echo '<meta name="author" content="tim truong">'
#echo '<script language="livescript">'
#echo '<!- - - - to hide from old browsers - - - -'
#echo '// end hiding - ->'
#echo '</script>'
echo '</head>'
echo '<body background=". ./paper/chalk.xxx">'
#- - - - - - - - - - - determine method - - - - - - - - - - -
if [ $REQUEST_METHOD = "GET" ] ; then
    BUFF=$QUERY>STRING
else
    LENGTH=$CONTENT_LENGTH
    if [ $LENGTH -gt '32000' ] ; then
        echo '<hr>'
        echo '<h3> Sorry, you had sent a too long text</h3>'
        echo '<hr>'
        echo '</body>'
        echo '</html>'
        exit
    fi
    read BUFF
fi
#- - - - - - - - - - - parse input - - - - - - - - - - -
echo $BUFF |
       /proj/wildfire/parser1.p1 |
while read line
do
   field_name=`echo $line | cut -f1 -d=`
   field_value=`echo $line | cut -f2 -d=`
   case $field_name in
     idtext)
       Id="$field_value"
       ;;
     passwdtext)
       Passw="$field_value"
       ;;
     dirpath)
       Dir="$field_value"
       ;;
   esac
done
#- - - - - - - - - - - check security - - - - - - - - - - -
if [ "$Id" != 'tmt' ] || [ "$Passw" != 'tmt' ]; then
   echo '<hr>'
   echo '<h3> Sorry, you are not allowed to use this
function.</h3>'
   echo '<hr>'
   echo '</body>'
   echo '</html>'
   exit
fi
#- - - - - - - - - - - send stuff to browser - - - - - - - - - - -
echo    '<form    method="post"    action="/PRC-cgi-bin/tex1"
target="bodyframe">'
echo '<h2>Please select a file for editing.</h2>'
echo '<p>'
echo '<table border=0 cellspacing=10>'
echo '<tr>'
Index=1
cd "$Dir"
for | in `ls` ; do
   if [ $Index = 10 ] ; then
       echo '</tr>'
       echo '<tr>'
       Index=1
   fi
   Ftype=`file $I | awk '{print $2}'`
   case $Ftype in
   data)
       ;;
   directory)
       ;;
   *)
     echo '<td>'
     echo  <input type="radio" name="filename" value=" "$I" ">'$I
     echo <</td>'
     ;;
   esac
   Index=`expr $Index + 1`
done
echo '</tr>'
echo '</table>'
echo '<hr>'
echo '<input type="submit" value="Edit File">'
echo '<input type="reset" value="clear">'
echo '<input type="hidden" value='$Dir' name='dirpath'>"
#- - - - - - - - - - - closing tags - - - - - - - - - - -
echo '</form>'
echo '</body>'
echo '</html>'
#- - - - - - - - - - - - - - - - - - - - - - - - - - - - - - - - - - - - - - - - -

# author: Timothy M. Truong

#- - - - - - - - - - - - - - - - - - - - - - - - - - - - - - - - - - - - - - - - -
echo 'Content-type: text/html\n\n'
echo ' '
echo ' '
echo '<html>'
echo '<head>'
echo ' '
echo "<TITLE>Remote Editor System</title>"
echo '<base href="http://www.sets/">'
echo '<meta name="author" content="tim truong">'
#echo '<script language="livescript">'
#echo '<!- - - - to hide from old browsers - - - - '
#echo '// end hiding -->'
#echo '</script>'
echo '</head>'
echo '<body background=". ./paper/chalk.xxx">'
echo   '<form   method="post"   action="/PRC-cgi-bin/tex2"
target="bodyframe">'
#- - - - - - - - - - - determine method - - - - - - - - - - -
if [ $REQUEST_METHOD = "GET" ] ; then
    BUFF=$QUERY>STRING
else
    LENGTH=$CONTENT_LENGTH
    if [ $LENGTH -gt '32000' ] ; then
        echo '<h3> Sorry, you had sent a too long text</h3>'
        echo '<hr>'
        echo '</body>'
        echo '</html>'
        exit
    fi
    read BUFF
fi
echo $BUFF > /tmp/kill
#- - - - - - - - - - - parse input - - - - - - - - - - -
echo $BUFF |
      /proj/wildfire/parser1.p1 |
while read line
do
   field_name=`echo $line | cut -f1 -d=`
   field_value=`echo $line | cut -f2 -d=`
   case $field_name in
     dirpath)
       Dir="$field_value"
```

APPENDIX A-continued

```
      ; ;
    filename)
      FileName=$field_value"
      ; ;
  esac
done
#- - - - - - - - - - process - - - - - - - - - - -
echo "<h2>$FileName ($DirPath)</h2>"
cd $DirPath
Result='grep -ci '</textarea>' "$FileName"'
if [ $Result != 0 ] ; then
    echo '<hr>'
    echo '<h3>Sorry, the file you selected contains data that
conflict'
    echo 'with this program thus makes it unviewable and
uneditable. '
    echo '</h3>'
    echo '<hr>'
    echo '</body>'
    echo '</html>'
    exit
else
    echo '<pre>'
    echo '<textarea name="filedata" rows=20 cols=80>'
    cat "$FileName"
    echo '</textarea>'
    echo '</pre>'
    echo '<hr>'
    if [ -w "$FileName" ] ; then
        echo '<input type="submit" value="SAVE">'
    else
        echo '<input type="button" value="File Is Read Only">'
    fi
fi
echo '<input type="reset" value="ABORT">'
echo '<input type="hidden" value=""$DirPath"" name="dirpath">'
echo '<input type="hidden" value=""$FileName"" name="filename">'
echo '</form>'
#- - - - - - - - - - closing tags - - - - - - - - - - -
echo '</body>'
echo '</html>'
#- - - - - - - - - - - - - - - - - - - - - - - - - - - -

# author: Timothy M. Truong

#- - - - - - - - - - - - - - - - - - - - - - - - - - - -
echo 'Content-type: text/html\n\n'
echo ' '
echo ' '
echo '<html>'
echo '<head>'
echo ' '
echo "<TITLE>Remote Editor System</title>"
echo '<base href="http://www.sets/">'
echo '<meta name="author" content="tim truong">'
#echo '<script language="livescript">'
#echo '<!- - - - to hide from old browsers - - - -'
#echo '// end hiding - ->'
#echo '</script>'
echo '</head>'
echo '<body background=". ./paper/chalk.xxx">'
echo '<form method="post" action="/PRC-cgi-bin/tex2"
target="bodyframe">'
#- - - - - - - - - - determine method - - - - - - - - - -
if [ $REQUEST_METHOD = "GET" ] ; then
    BUFF=$QUERY>STRING
else
    LENGTH=$CONTENT_LENGTH
    if [ $LENGTH -gt '32000' ] ; then
        echo '<h3> Sorry, you had sent a too long text</h3>'
        echo '<hr>'
        echo '</body>'
        echo '</html>'
        exit
    fi
    read BUFF
fi
echo $BUFF > /tmp/kill
#- - - - - - - - - - parse input - - - - - - - - - -
echo $BUFF |
    /proj/wildfire/parser2.pl |
while read line
do
    field_name=`echo $line | cut -f1 -d=`
    field_value=`echo &line | cut -f2 -d=`
    case $field_name in
      dirpath)
        Dir="$field_value"
        ; ;
      filename)
        FileName="$field_value"
        ; ;
      filedate)
        FileData="$field_value"
        ; ;
    esac
done
#- - - - - - - - - - process - - - - - - - - - - -
cd $DirPath
cat /tmp/tex2.$FileData > "$DirPath/$FileName"
echo '<hr>'
echo '<p>File  <b>'  "$DirPath/$FileName"  '</b>  updated
successful</h1>'
echo '<hr>'
#- - - - - - - - - - closing tags - - - - - - - - - - -
echo '</body>'
echo '</html>'
yes | rm /tmp/tex2.%FileData
#- - - - - - - - - - - - - - - - - - - - - - - - - - - -

# author: Timothy M. Truong

#- - - - - - - - - - - - - - - - - - - - - - - - - - - -
$formData = <STDIN>;
chop ($formData) ;
chop ($formData) ;
#- - - - - - - - - - parse input - - - - - - - - - -
foreach (split(/&/, $formData ))
{
    ($fieldName, $fieldValue) = split (/=/,$_);
    $fieldName =~ s/\+//g;
    $fieldName =~ s/%([0-9|A-F] {2})/pack {C,hex($1)/eg;
    $fieldValue =~ s/\+//g;
    $fieldValue =~ s/%(0[AD])//eg;
    $fieldValue =~ s/%([0-9|A-F] {2})/pack {C, hex ($1))/eg;
    $myData{$fieldName} = $fieldValue;
}
#- - - - - - - - - - assign values - - - - - - - - - -
foreach $term (keys(%myData))
{
    print ($term, "=",$myData{$term},"\n");
}
#- - - - - - - - - - - - - - - - - - - - - - - - - - - -

# author: Timothy M. Truong

#- - - - - - - - - - - - - - - - - - - - - - - - - - - -
unless (open (OUTfile, ">/tmp/tex2.$$"))
{
    die (" ");
}
$formData = <STDIN>;
chop ($formData) ;
#- - - - - - - - - - parse input - - - - - - - - - -
foreach (split(/&/, $formData ))
{
    ($fieldName, $fieldValue) = split (/=/,$_);
    $fieldName =~ s/\+//g;
    $fieldName =~ s/%([0-9|A-F] {2})/pack (C,hex($1))/eg;
    $fieldValue =~ s/\+//g;
    if ($fieldName ne 'filedata')
    {
        $fieldValue =~ s/%([0-9|A-F] {2})/pack (C, hex ($1))/eg;
#. .     chop($fieldValue) ;
    }
    else
    {
        $fieldValue =~ s/%0D%0A/\n/g;
```

APPENDIX A-continued

```
    $fieldValue =~ s/%(0-9|A-F) {2})/pack (C,hex($1))/eg;
    print OUTfile ($fieldValue) ;
    $fieldValue ="$$";
    }
    $myData{$fieldName} = $fieldValue;
    }
}
#- - - - - - - - - - assign values - - - - - - - - - - -
foreach $term (keys(%myData))
    {print ($term,"=",$myData{$term},"\n");}
```

What is claimed is:

1. A remote system administration method, comprising:

receiving an editor input form at a forms-enabled and script-enabled web browser through a network from a server in response to a request from a client, the web browser resident on the client;

sending a server path input to the server from the web browser;

receiving a file selection form from the server, the file selection form including filenames identifying files included in a server path defined by the server path input;

sending a file selection from the web browser to the server, the file selection identifying one of the files;

receiving a copy of the one of the files from the server;

editing the copy of the one of the files using the web browser without the use of a plug-in to the web browser to produce an updated file; and sending the updated file to the server for storage.

2. The method of claim 1, further comprising saving the updated file at the server.

3. The method of claim 1, further comprising performing system failure recovery operations in response to the updated file.

4. The method of claim 1, further comprising using the updated file to perform one of the group consisting of assigning a user account, identifying a security access level, allocating storage space, and monitoring unauthorized access.

5. The method of claim 1, further comprising receiving an indication at the client that selected text is present in the one of the files.

6. The method of claim 1, further comprising receiving a message at the client indicating that the one of the files is a read-only file and receiving the copy of the one of the files at the web browser for viewing.

7. A remote system administration method, comprising the steps of:

communicating an editor input form from a server through a network to a client in response to receiving a request from the client, the client using a forms-enabled and script-enabled web browser;

receiving a server path input at the server from the web browser;

communicating a file selection form from the server to the web browser, the file selection form including filenames identifying files included in a server path defined by the server path input;

receiving a file selection from the web browser at the server, the file selection identifying one of the files; and communicating a copy of one of the files from the server to the web browser for editing;

receiving by the server an updated file for storage, the updated file produced by editing the copy of the one of the files using the web browser without the use of a plug-in to the web browser.

8. The method of claim 7, further comprising the step of saving the updated file at the server.

9. The method of claim 7, further comprising using the updated file to perform one of the group consisting of performing system failure recovery operations, assigning a user account, identifying a security access level, allocating storage space, and monitoring unauthorized access.

10. The method of claim 7, further comprising searching the one of the files to determine if selected text is present.

11. The method of claim 7, further comprising communicating a text message to the client indicating that the one of the files is not viewable by the web browser.

12. The method of claim 7, further comprising analyzing the one of the files to determine if the one of the files is a read-only file, communicating a message to the client indicating that the one of the files is a read-only file and communicating the copy of the one of the files to the web browser for viewing.

13. A remote system administration editor system, comprising:

a storage medium for storing at least one computer file; and a server responsive to one or more of the computer files of the storage medium to communicate an editor input form to a client using a network in response to receiving a request from the client, the client using a forms-enabled and script-enabled web browser;

receive a server path input in response to the editor input form from the web browser;

communicate a file selection form to the web browser that includes the text of the filenames identifying files included in a server path defined by the server path input;

receive a file selection in response to the file selection form, the file selection identifying one of the files;

communicate a copy of the one of the files associated with the file selection to the web browser for editing; and receive an updated file for storage, the updated file produced by editing the copy of the one of the files that has been edited with the web browser without the use of a plug-in to the web browser.

14. The system of claim 13, wherein the server is responsive to save the updated file.

15. The system of claim 13, wherein the server is responsive to perform one of the group consisting of performing system failure recovery operations, assigning a user account, identifying a security access level, allocating storage space, and monitoring unauthorized access in response to the updated file.

16. The system of claim 13, wherein the editor input form and the file selection form are provided to the web browser in hypertext markup language format.

17. The system of claim 13, wherein the server is responsive to search the one of the files to determine if selected text is present.

* * * * *